(12) United States Patent
Stegman et al.

(10) Patent No.: US 6,788,195 B1
(45) Date of Patent: Sep. 7, 2004

(54) LIGHT MONITOR

(75) Inventors: Todd Robert Stegman, Cincinnati, OH (US); Matt Michael Leonard, Wheaton, IL (US)

(73) Assignee: Osborne Coinage Company, Cincinnati, OH (US)

( * ) Notice: Subject to any disclaimer, the term of this patent is extended or adjusted under 35 U.S.C. 154(b) by 201 days.

(21) Appl. No.: 10/216,370

(22) Filed: Aug. 9, 2002

(51) Int. Cl.$^7$ .............................................. B60Q 11/00
(52) U.S. Cl. ...................... 340/458; 340/80; 340/642; 307/10.8
(58) Field of Search .................. 340/80, 458, 641, 340/642, 510, 652, 653, 693.1; 702/63, 82, 183; 315/86; 363/101

(56) References Cited

U.S. PATENT DOCUMENTS

| | | | |
|---|---|---|---|
| 4,173,750 A | * 11/1979 | Riba | 340/80 |
| 4,808,975 A | 2/1989 | Hochhaus et al. | 340/641 |
| 5,075,669 A | 12/1991 | Nakadozono et al. | 340/458 |
| 5,144,282 A | 9/1992 | Sutterlin et al. | 340/458 |
| 5,173,685 A | 12/1992 | Nimmo | 340/642 |
| 5,235,317 A | * 8/1993 | Sutterlin et al. | 340/458 |
| 5,801,623 A | 9/1998 | Chen et al. | 340/458 |
| 6,157,296 A | 12/2000 | Endoh | 340/458 |
| 6,218,952 B1 | 4/2001 | Borland et al. | 340/641 |
| 6,502,044 B1 | * 12/2002 | Lane et al. | 363/101 |

* cited by examiner

*Primary Examiner*—Don Wong
*Assistant Examiner*—Jimmy T. Vu
(74) *Attorney, Agent, or Firm*—Frost Brown Todd LLC

(57) ABSTRACT

A monitor for a light circuit comprising a power source, a light being monitored, and a sense resistor. A first voltage amplifier circuit connected to the light circuit has a first output signal representing the voltage across the sense resistor. A second voltage amplifier circuit connected to the circuit has a second output signal representing the voltage across the sense resistor. A microprocessor is configured to receive the output signals from the first and second voltage measuring circuit and is programmed to calculate the current to the light based on the first and second digital output signals, compare the calculated current against a threshold current, and initiate a failure signal if the calculated current is less than the threshold current. A visual indicator activates if the microprocessor initiates a failure signal, whereby the activated indicator notifies that the light is not operating correctly. The calculated current is based on the first output signal if the light is a low current light, and the current is calculated is based on the second output signal if the light is a high current light. The calculated current can be a function of the measured voltage of the power source. The threshold current can be a percentage of a calibrated current, which is based on a measured voltage across the sense resistor when the light is operating correctly.

23 Claims, 6 Drawing Sheets

US 6,788,195 B1

LIGHT MONITOR

FIELD OF THE INVENTION

The present invention relates in general to light monitors, and will be illustrated in the context of monitoring exterior lights of vehicles such as school buses.

BACKGROUND

An ongoing challenge facing people who operate and maintain vehicles is determining when various lights in the vehicle are operating properly. For instance, in the case of a school bus the driver needs to know if the various exterior signal lights are operating properly. Ideally, the operator should know when a light fails as soon as possible so that appropriate remedial measures may be taken to fix or replace the light. Adding to the challenge of light monitoring are the wide range of electrical currents used by different lights. For instance, exterior signal lights have traditionally been incandescent lights, often using up to 10 amps or more of current per light. Increasingly, however, an array of light emitting diodes (LED) are being used in place of incandescent lights. LEDs offer a variety of advantages over incandescent lights, however, LEDs use a substantially lower current compared to incandescent lights, often less than 1 amp of current. LEDs are increasingly being retrofitted into older vehicles to replace existing incandescent lights. While a number of vehicle light monitors have been conceived, none adequately solve the problems in the manner of the present invention.

SUMMARY

One example of the present invention is a monitor for a light circuit comprising a power source, a light being monitored, and a sense resistor. In one embodiment, the sense resistor is connected in series with the light. A first voltage amplifier circuit connected to the light circuit has a first output signal representing the voltage across the sense resistor. A second voltage amplifier circuit connected to the circuit has a second output signal representing the voltage across the sense resistor. A microprocessor is configured to receive the output signals from the first and second voltage measuring circuit and is programmed to calculate the current to the light based on the first and second digital output signals, compare the calculated current against a threshold current, and initiate a failure signal if the calculated current is less than the threshold current. An indicator activates if the microprocessor initiates a failure signal, whereby the activated indicator notifies that the light is not operating correctly.

In one embodiment, the light is an exterior light on a vehicle that is an incandescent light or a plurality of LEDs. The indicator can be an LED visible to the vehicle operator. In another embodiment, the first and second voltage amplifier circuits each comprise an analog to digital converter and the output signals are digital. The first and second digital output signals may each have a maximum value. In yet another embodiment, the calculated current is based on the first output signal if the light is a low current light, and the current is calculated is based on the second output signal if the light is a high current light. The low current can have a variety of ranges, such as being greater than about 0 amps and less than about 1 amp. The high current can have a variety of ranges, such as greater than about 1 amp and less than about 10 amps. The calculated current can be based on the second output signal if the second output signal is greater than a threshold value, and the current is calculated is based on the first output signal if the second output signal is less than the threshold value.

In still another embodiment, the first and second voltage amplifier circuits each comprise an operational amplifier. The gain ratio between the first and second operational amplifier can be about 1:10, however, other ratios are also possible. In another embodiment, the calculated current can be a function of the measured voltage of the power source. The threshold current can be a percentage of a calibrated current, which is based on a measured voltage across the sense resistor when the light is operating correctly.

Another example of the present invention is a system for monitoring the operability of exterior lights on a vehicle. A plurality of light circuits each comprise an exterior light on the vehicle. A plurality of sense resistors each connect to a light circuit in series with the corresponding exterior light. A plurality of first operational amplifiers each connect in parallel with a sense resistor, each first operational amplifier amplifies the voltage across the corresponding sense resistor to generate a first amplified signal. One or more multiplexers are connected to the operational amplifiers to select a first amplified signal. At least one second operational amplifier is connected to the one or more multiplexers and amplifies the selected first amplified signal to generate a second amplified signal. An analog to digital converter converts the second amplified signal into a digital value. Visual indicators notify the vehicle operator if an exterior light is inoperable. A microprocessor is programmed to control the multiplexers to select a first amplified signal corresponding to an exterior light, calculate the current through the sense resistor based on the digital value corresponding to the selected first amplified signal, and compare the calculated current against a threshold current. If the calculated current is less than the threshold current the indicator corresponding to the exterior light activates.

In one embodiment, a low impedance buffer buffers the first amplified signal. In another embodiment, the second operational amplifier comprises a low current operational amplifier and a high current operational amplifier. In yet another embodiment, the calculated current is based on the second amplified signal from the low amperage operational amplifier if the light is a low current light, and the calculated current is based on the second amplified signal from the high current operational amplifier if the light is a high current light. The low current light can have a variety of ranges, such as being greater than about 0 amps and less than about 1 amp. The high current light can have a variety of ranges, such as greater than about 1 amp and less than about 10 amps. In still another embodiment, the calculated current is based on the digital value corresponding to the high current operational amplifier if such digital value is greater than a threshold value, and if such digital value is less than the threshold value then the current is calculated is based on the digital value corresponding to the low current operational amplifier.

In yet another example of the present invention, a plurality of exterior lights on the vehicle each have a corresponding light circuit and power source. A means for determining a calibrated current for each of said lights is provided. A means for measuring a voltage in each light circuit is provided where said measured voltage is proportional to the current to the corresponding light. A means for calculating the current to a selected light based on the corresponding measured voltage is provided. A means for normalizing the calculated current based on the voltage of the power source is also provided. A means determines if a light is inoperable based on the corresponding normalized calculated current and the corresponding calibrated current. A means signals the vehicle operator if light is determined to be inoperable.

Still other examples, features, aspects, embodiments, and advantages of the invention will become apparent to those skilled in the art from the following description, which is by way of illustration, one of the best modes contemplated for carrying out the invention. As will be realized, the invention is capable of other different and obvious aspects, all without departing from the invention. Accordingly, the drawings and descriptions should be regarded as illustrative in nature and not restrictive.

BRIEF DESCRIPTION OF THE DRAWINGS

While the specification concludes with claims which particularly point out and distinctly claim the invention, it is believed the present invention will be better understood from the following description taken in conjunction with the accompanying drawings, in which like reference numerals identify the same elements and in which:

DETAILED DESCRIPTION

While the examples of invention are described hereafter with respect to light monitors for school buses, it should be understood that the invention can be adapted for use on a variety of other vehicles. For example, the teachings presented herein would also be suitable for use to monitor light on commercial buses, motor coaches, recreational vehicles, air planes, boats, automobiles, and the like. Further, the present teaching could also be applied to monitoring lights other than in vehicles.

Figure 1:
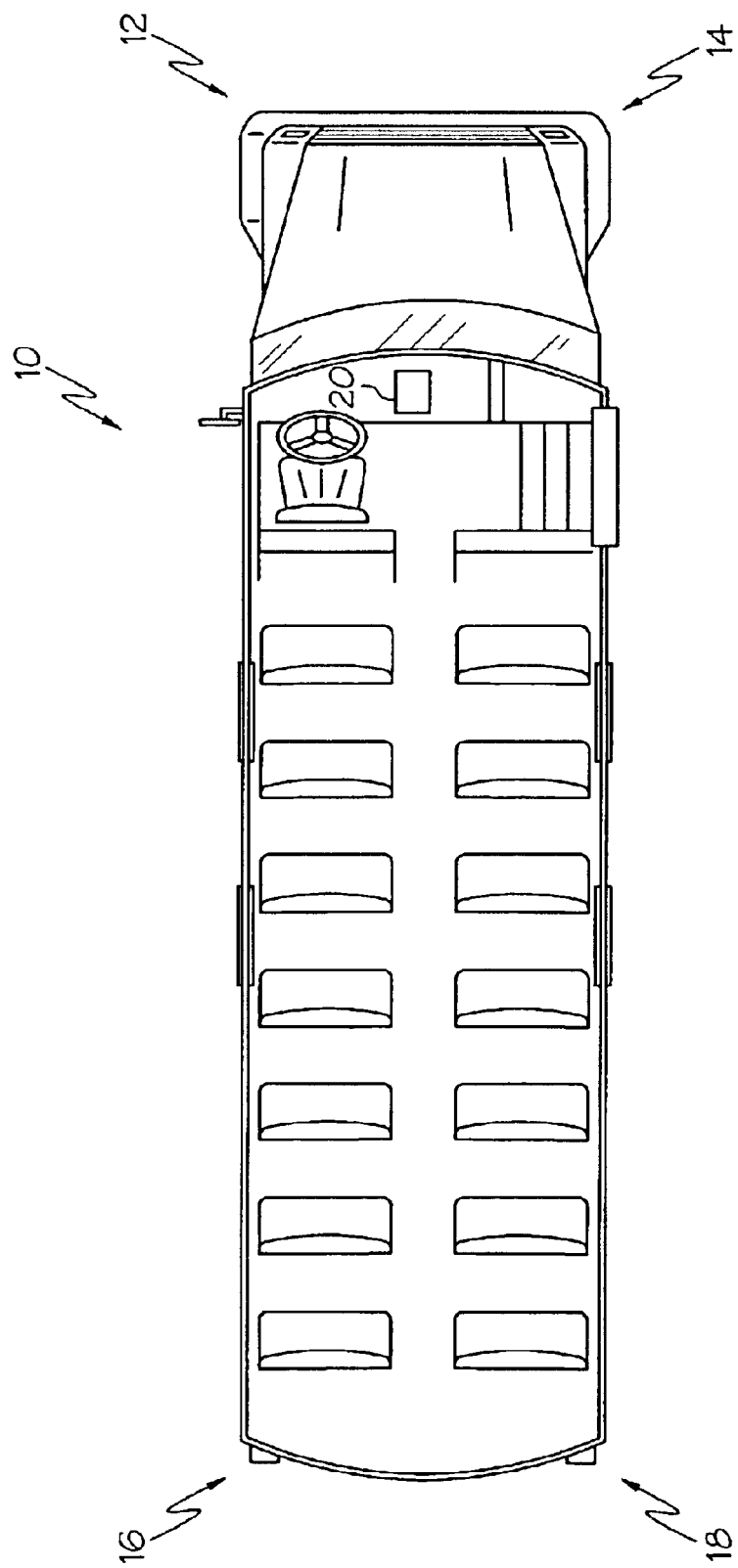
FIG. 1 is a schematic view of a school bus.

Referring now to the drawings in more detail and initially to FIG. 1, there is shown a vehicle, which in this example is a school bus 10. The school bus 10 includes a driver's seat, a plurality of passenger seats, and a front passenger door. The school bus 10 also comprises a plurality of exterior lights. As shown here, the exterior lights are generally located on the front left 12, front right 14, rear left 16 and rear right 18 portions of the bus, however, lights could be located in other exterior portions of the bus or in the interior of the bus. Some examples of exterior lights include brake lights, tail lights, reverse lights, turn signals, red warning signals, amber warning signals, head lamps, and the like.

The bus 10 also includes a monitor panel 20, preferably located in a position visible to the driver during operations, such as on the dashboard. The monitor panel 20 provides visual indicators of the operating status of the various exterior signal lights on the bus. In general, each monitored light or grouping of lights will have its own unique visual indicator. In one example, the individual indicators comprise light emitting diodes (LEDs) of any color, however, one skilled in the art will recognize that any suitable indicator capable of providing a visual signal to the driver may be used with equal facility. For example, the visual indicator can take the form of incandescent bulbs, liquid crystal displays, CRT's, or other ways known in the art. In one example, the various visual indicators are arranged relative to the visual representation of the vehicle 10 to indicate to the location of each of the lights being monitored. In another example, each visual indicator includes a text label describing the corresponding exterior light. One with ordinary skill in the art will readily recognize that the configuration, designation and number of visual indicators can be varied based on numerous preferences and bus configurations. Further, audio indicators may be used instead of or in injunction with visual indicators.

Figure 2:
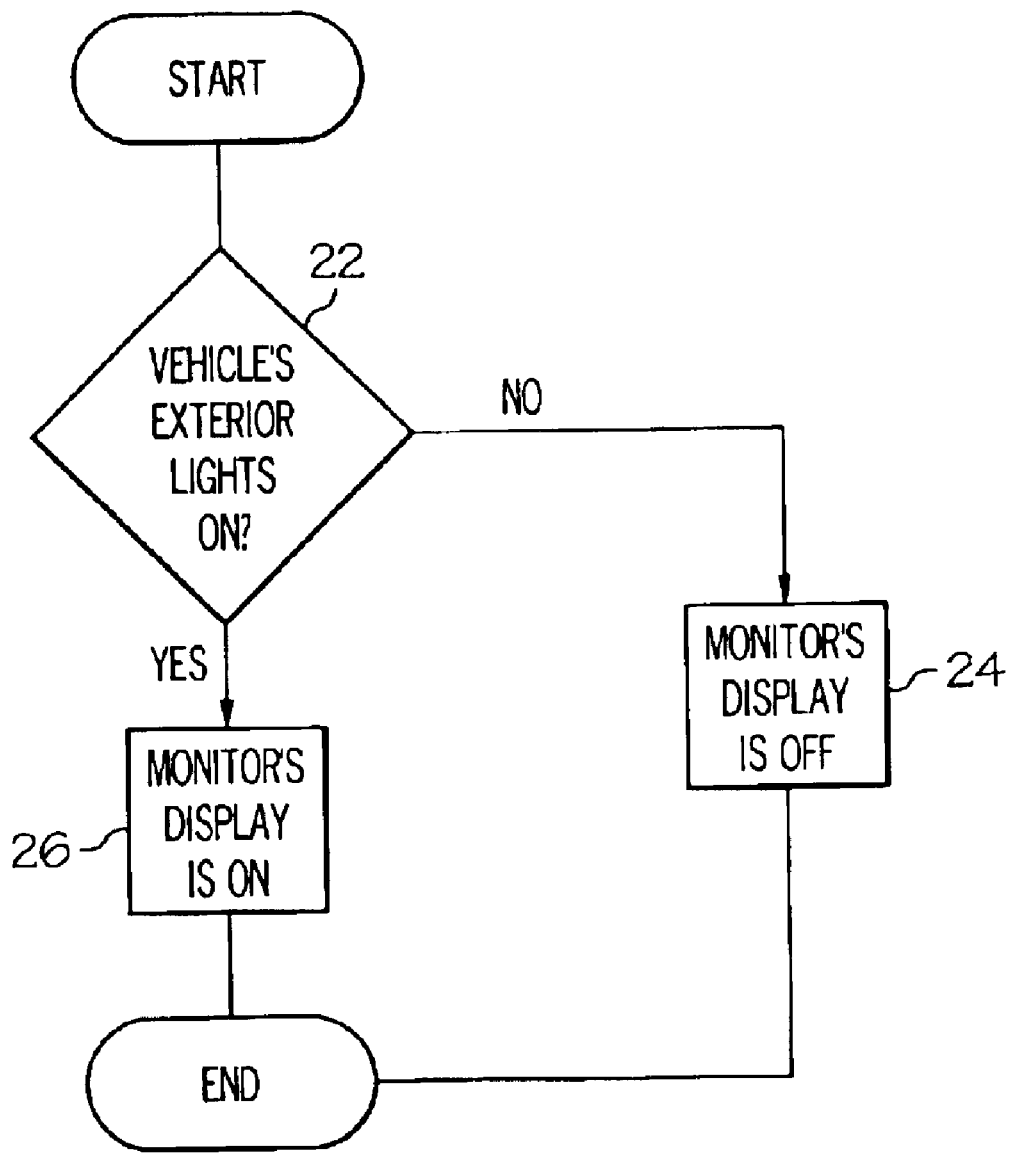
FIG. 2 illustrates an example of a basic light monitor functionality.

FIG. 2 illustrates a basic flowchart 20 of the operation of a light monitor. At junction 22, the monitor determines whether the exterior lights are on and operating within normal parameters. If yes, then at action 26 the visual indicator corresponding to the light activates indicating that the light is on and functioning properly. If not, then at action 24 the corresponding visual indicator turns off or provides another visual indication that the light is not operating correctly, such as flashing or by changing colors (for instance, from green to red). Optionally, an audible signal may also sound to provide an additional prompt to the driver that a light has malfunctioned.

Figure 3:
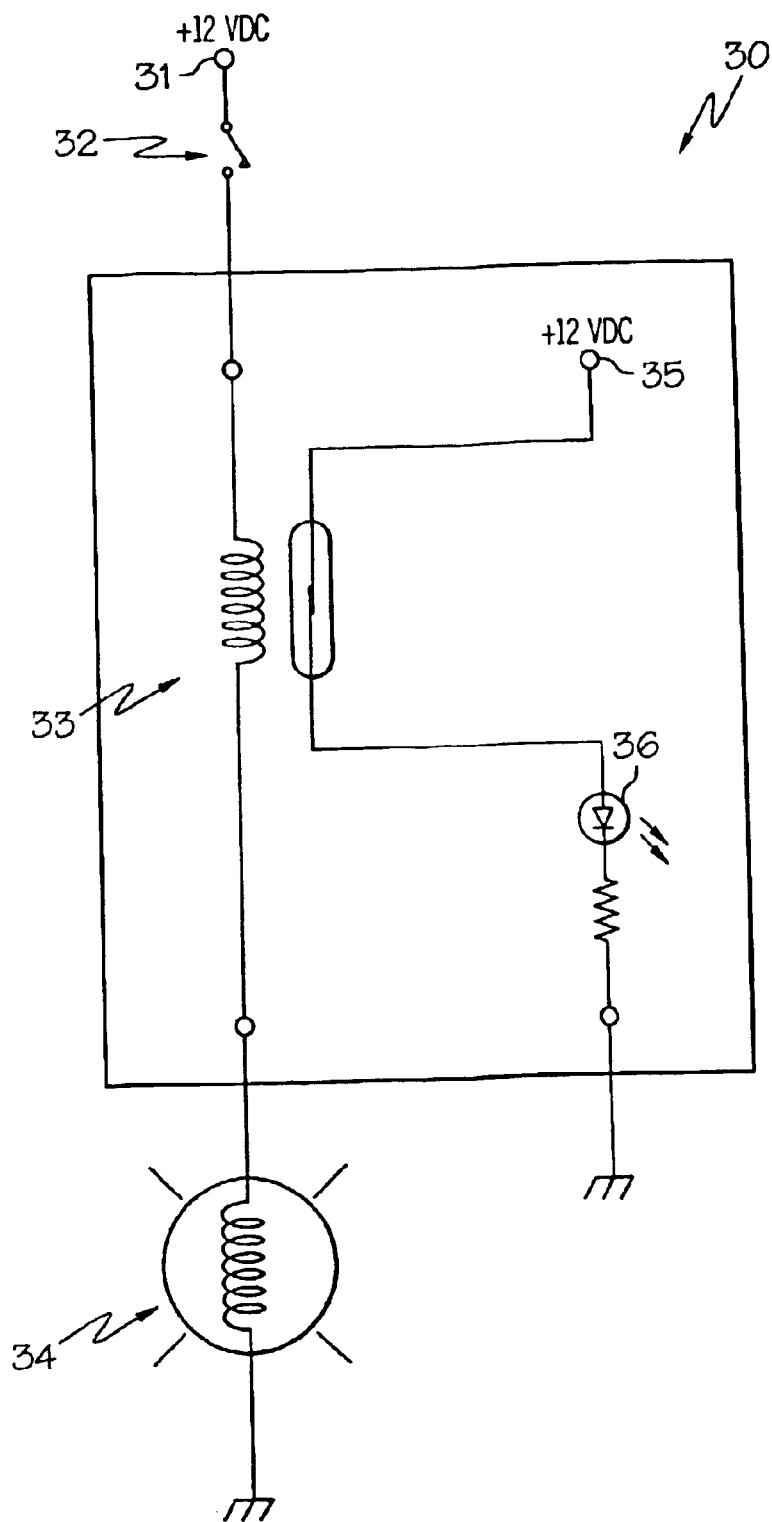
FIG. 3 illustrates an example of a circuit design for a light monitor.

FIG. 3 illustrates an example of a circuit 30 for monitoring the operability of lights. The light 34 has a light circuit comprising a power source 31, a switch 32, and the coil portion of a reed relay 33. A monitor circuit includes a power source 35, the switch portion of the reed relay 33, and a visual indicator (shown here in this example as an LED). When the switch 32 is open and the light is operating, the current through the relay 33 opens the monitor circuit thus activating the visual indicator 36. When the switch 32 is closed or the light ceases to operate, the relay 33 ceases to be energized and the monitor circuit breaks resulting in the visual indicator turning off. The relay 33 is sized to accommodate the normal operating current of the light 34.

Figure 4:
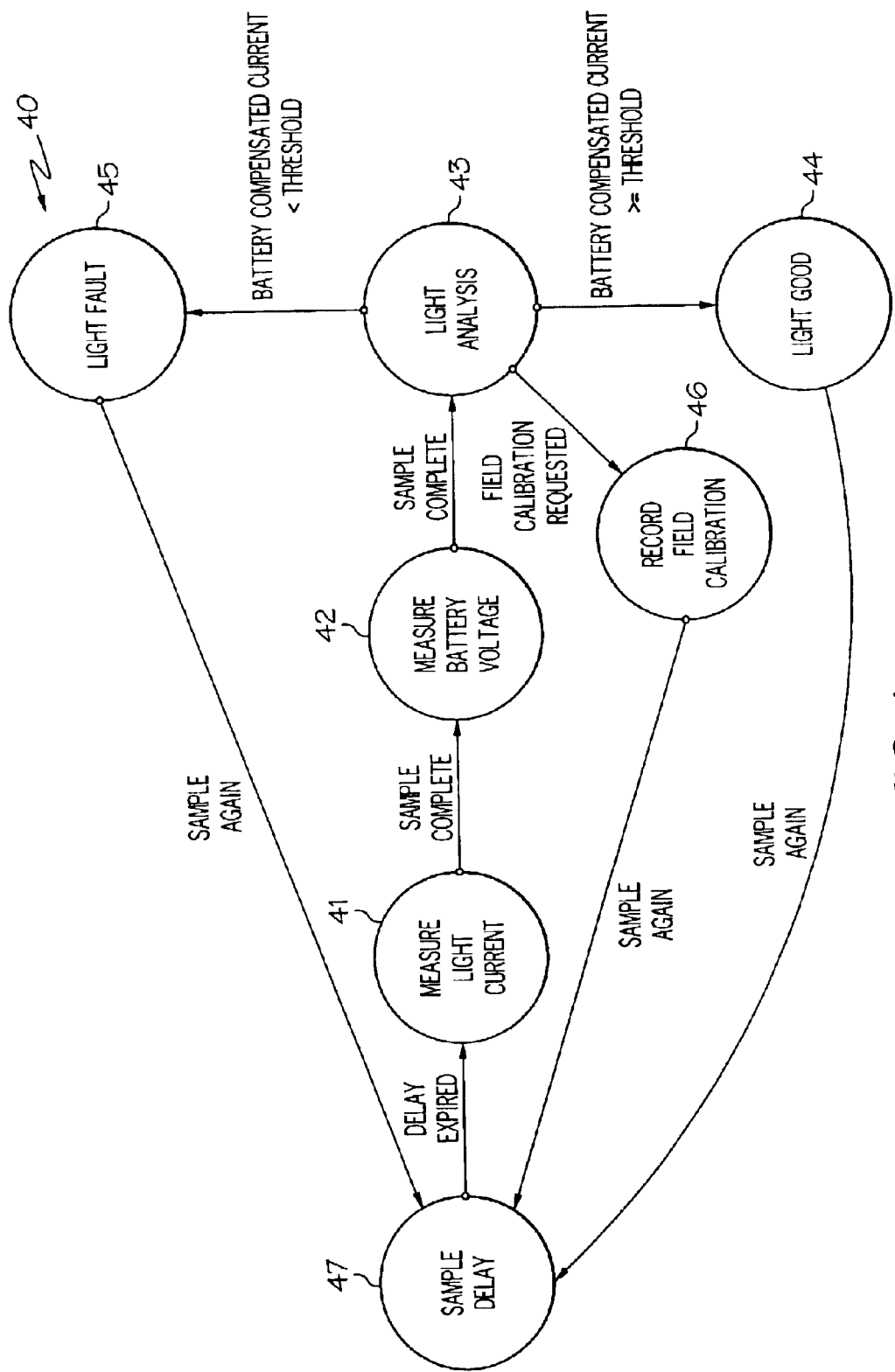
FIG. 4 illustrates an example of a state diagram for a light monitor.

FIG. 4 illustrates another example of a light monitor. In this example, the various states or phases of the monitor are shown in the state diagram 40. It is assumed that the light being measured has a circuit comprising at least a power source and the light. In state 41, the current flowing to the light during operation is measured resulting in a sample current. The sampled current can be a single measurement or the average of a plurality of measurements. After the sample current is compete, at stage 42 the power source is measure, which as shown here comprises measuring the voltage of the battery powering the light. The sampled voltage can be a single measurement or the average of a plurality of measurements.

After the sample voltage is compete, at state 43 the operability of the light is analyzed. In one example, sampled current is compared to a threshold current. The threshold current can be a factory set value, a value set in the field, a field calibrated current, a percentage of any of the foregoing, or the like. In another example, the light analysis compensates for variations in the battery voltage which can impact the current to the light. To account for battery variations, the sample current can be normalized and then compared to the threshold current based on the sample voltage and the voltage from which the threshold current is based. If the sampled current (normalized or not) is greater than or equal to the threshold current, then the light is considered to be operating properly, thus advancing to state 44 where an optional signal is sent indicating that the light is okay. If the sampled current (normalized or not) is less than the threshold current, then the light is considered to be inoperable (whether due to being burned-out or deteriorated), thus advancing to state 45 where a visual and/or audible is signal is sent to indicate a light fault.

Leaving states 44 or 45, the monitor continues to state 47 where a sample delay is initiated, generally a fixed or variable time period. After the delay has expired, the monitor returns to state 41. Alternatively, the sample delay 47 could comprise rotating the sample to the next light to be monitored, in which case a given light would be measured again after all the other lights have been measured and analyzed. If a field calibration is requested (such as, for instance, by selecting a button or switch), the monitor advances to state 46. The monitor returns to state 47, but when the sample current and sample voltage are determined in states 41 and 42, the resulting normalized current is used to determined the threshold current for the purposes of subsequent light analyses.

Figure 5:
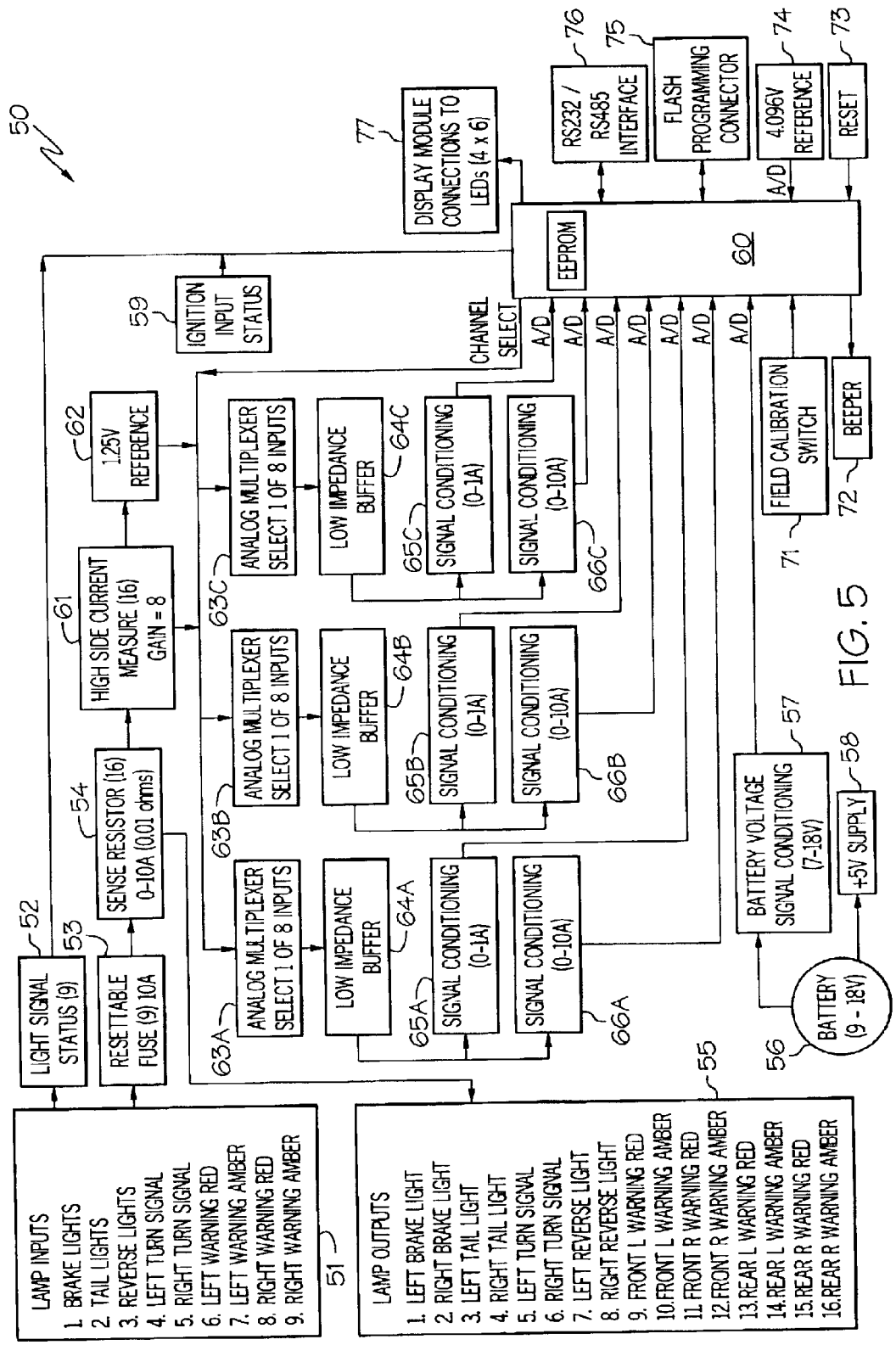
FIG. 5 illustrates an example of a schematic diagram for a light monitor.

FIG. 5 illustrates another example of a light monitor system shown in a schematic 50 of the various components and their interoperability. In the present example, the system monitors a total of sixteen lights 55 on a school bus as listed in the figure. Each light 55 has a light circuit powered by the battery 56. The system works by monitoring the light circuit current levels. A light 55 failure is detected when the measured circuit current for a light 55 drops by a predefined percentage from the calibration value, with built-in compensation for battery voltage variance. This monitor can successfully monitor either incandescent or an LED light array. The lights 55 are activated and deactivated in the course of operating the vehicle. The inputs 51 signal when a corresponding light 55 has been activated. In the present example, some inputs 51 correspond to the circuits of multiple lights 55. For instance, the brake light input corresponds to the left and right brake lights. Each of the nine inputs 51 has a light signal status 52 that signals the microprocessor 60 that the corresponding light 55 has been attempted to be activated. When the battery 56 voltage is applied to a light circuit, the status of the voltage to the corresponding light 55 can be detected regardless of the current flow. If the input 51 signals with absolutely no current flow, the voltage level can still be detected to indicate a fault condition. So in addition to current drops in a light circuit, a complete fault can be detected as well. Each of the nine inputs 51 also has a corresponding fuse 53 to protect the light circuit from an over-current condition. Upon exceeding the rated current level the fuse 53 breaks the corresponding light circuit and resets after sufficient time to cool the allowing the circuit to function again within the rated current levels.

Each of the sixteen lights 55 being monitored has a corresponding sense resistor 54, although a sense resistor could correspond to multiple lights. Preferably, each sense resistor 54 is connected in series with the corresponding light 55. The measured voltage drop across the sense resistor 54 is a function of the current passing through the sense resistor 54, and the measured voltage is used by the microprocessor 60 to calculate the current of each light circuit In the present embodiment, each sense resistor 54 is a 0.01 Ω electrical resistor, however, other rated resistors may also be employed. The voltage drop across the sense resistor 50 is small enough to have inconsequential effects on the rest of the light circuit operation.

The battery 56 powers each of the light circuits for the lights 55. The voltage signal conditioning circuit 57 is used to measure a sample voltage from the battery 56. The sample voltage can be a single voltage measurement or the average value of a plurality of voltage measurements. The sample voltage of 0–18 volts is scaled to the reference 64 and converted to a digital signal using an analog to digital converter, which digital signal is received by the microprocessor 60 for processing. The sampled voltage is used to normalize the calculated currents to compensate for voltage variances. The power supply 58 is a stepped-down voltage from the battery 56 and is used to power the various monitor components, including the microprocessor 60, circuits 61, 65, 66, multiplexers 63, visual indicator 77, and the like. The ignition input status 59 determines whether the monitor is operating or not. When the ignition status 59 is OFF the monitor is in the standby mode as the microprocessor 60 waits in an idle state. When the ignition status 59 is ON, the ignition mode is running and the features of the microprocessor 60 are active. When the ignition status 59 switches back to OFF, the control reverts back to the standby mode.

Each sense resistor 54 has a corresponding high side current sense measurement circuit 61. Each circuit 61 includes a voltage amplifier, such as an operational amplifier or op-amp, to measure the differential voltage across the corresponding sense resistor 54 and scale the output voltage by a known gain. In this example, the gain is a linear factor of eight, however, other gains may be used. Preferably, this amplifier has high precision and low temperature drift. The output signal may be offset by a bias or reference 62 voltage. In this example, the offset reference 62 is 1.25 volts.

The output signals from the circuits 61 are received by three multiplexers 63A, B and C. In this example, each multiplexer can handle up to eight inputs. The first multiplexer 63A handles the circuits for the first six lights 55 along with one signal for the offset reference 62 leaving one input open. The second multiplexer 63B handles the circuits for the next five lights 55 along with a signal for the offset reference 62 leaving two inputs open. The third multiplexer 63C handles the circuits for the last five lights 55 along with a signal for the offset reference 62 leaving two inputs open. Naturally, the number and type of multiplexers 63 can be changed based on the number of lights being monitored and the number of inputs that the multiplexer can handle. The microprocessor 60 controls the multiplexers 63 and determines which output signal from the circuit 61 is selected. The selected signal from the multiplexer 63A, B and C passes through a low impedance buffer 64A, B and C, respectively, to reduce voltage distortion.

The output signal from each multiplexer 64A, B and C is received by two signal conditioning voltage circuits 65, 66 A, B and C, respectively. Each circuit 65, 66 includes a voltage amplifier, such as an op-amp, to amplify the voltage of the multiplexer 64 output signal. In the present embodiment, the op-amps are differential op-amps that remove the offset reference 62 and amplify the voltage accordingly. The voltages of the output signal from the conditioning circuits 65, 66 are scaled to the reference 64 and converted to a digital signal which is received by the microprocessor 60 for processing to calculate the current in the corresponding light circuit.

The output signal from the first conditioning circuit 65 is used to calculate currents for fine or low current lights. In the present example, low current lights range from about 0 to about 1 amps, however, other ranges could also be used. The op-amp of the first conditioning circuit 65 has a linear gain factor of 55, however, other gains may be used. The output signal from the second conditioning circuit 66 is used to calculate currents for course or high current lights. In the present example, high current lights range from about 0 to about 10 amps, however, other ranges could also be used. The op-amp of the second conditioning circuit 66 has a linear gain factor of 5.5, however, other gains may be used. Accordingly, the gain ratio from the first and second conditioning circuits 65, 66 is about 1:10. Naturally the ranges for low and high current lights, as well as the respective gains and gain ratios, will vary depending upon the electrical specifications for the light circuits in a given application. The present example uses two conditioning circuits 65, 66 to facilitate greater sensitivity and accuracy for the low current measurements. It is conceived, however, that the first conditioning circuit 65 could be eliminated and both low and high current calculations be based on the output signal from the second conditioning circuit 66.

The output signal voltages from circuits 57, 65 and 66 for processing by the microprocessor 60 are scaled to a voltage reference 64, which in this example is 4.096 volts, such that a full-scale analog voltage measurement equals this reference 64. All voltage readings above this level are interpreted as full scale. Preferably, the reference 64 is an accurate value and has a low drift coefficient over the operating temperature range. The scaled voltage is then converted into a digital signal using an A/D.

When the ignition input status 59 is ON, the microprocessor 60 will repeatedly monitor the status of the various lights 55. When cycling through the queue of lights to check, the microprocessor 60 will ignore any light that does not have a corresponding light signal status 52 activated. The microprocessor 60 receives the output signals from the signal conditioning circuits 57, 65 and 66 and calculates the operating current for the various lights 55 based on the output signal voltages. Preferably, output signal from the conditioning circuits 65, 66 are sampled consecutively multiple times and averaged to obtain an average measurement. If the calculated current from the output signal from the second conditioning circuit 66 is greater than or equal to a threshold value (e.g. 1 amp), then the microprocessor 60 uses that calculated current. If the calculated current from the output signal from the second conditioning circuit 66 is less than the threshold value, then the microprocessor 60 calculates the current based on the output signal from the first conditioning circuit 65. If the calculated current is less than a calibrated threshold, the microprocessor will signal that the is operating improperly. If the calibrated current is greater than a calibrated threshold, then the light is considered to be operating properly and the next light in the queue is checked.

Each of the light circuits can be individually calibrated at the factory. Nevertheless, each light installation and application may be unique. For example, various wire lengths in a light circuit will drop the battery 56 voltage delivered to the light 55, thus lowering the deliverable current from the battery 56. As a further example, each light 55 within a particular model may have slightly different operating characteristics. As still another example, lights may be replaced in the field, such as replacing an incandescent light with may an array of LEDs. To account for unique applications, the present embodiment includes a field calibration feature. By pressing the calibration switch 71, the microprocessor 60 will recalibrate each light 55 to its present battery 56 compensated current level. The microprocessor 60 records a current threshold based on the measured current at the invocation of the calibration process.

The audible signal 72, which in this example is a beeper, is controlled by the microprocessor 60 and is used in a variety of situations, such as an audible alarm if a light 55 is determined to be inoperable. The reset 73 ensures that the microprocessor 60 powers up correctly when voltage is first applied by the power supply 58. The connector 75 is a 10 pin header for debugging and programming of the microprocessor 60. The interface 76 enables the microprocessor 60 to communicate with other devices. In the present example the interface is a serial port, however, other types interfaces are also contemplated such as USB, Firewire, Bluetooth, and the like. The visual display 77 includes a plurality of visual indicators, which in this example are LEDs, each corresponding to a light 55 and being controlled by the microprocessor 60 to visually indicate the operating status of the lights 55 based on the light current calculation.

Figure 6:
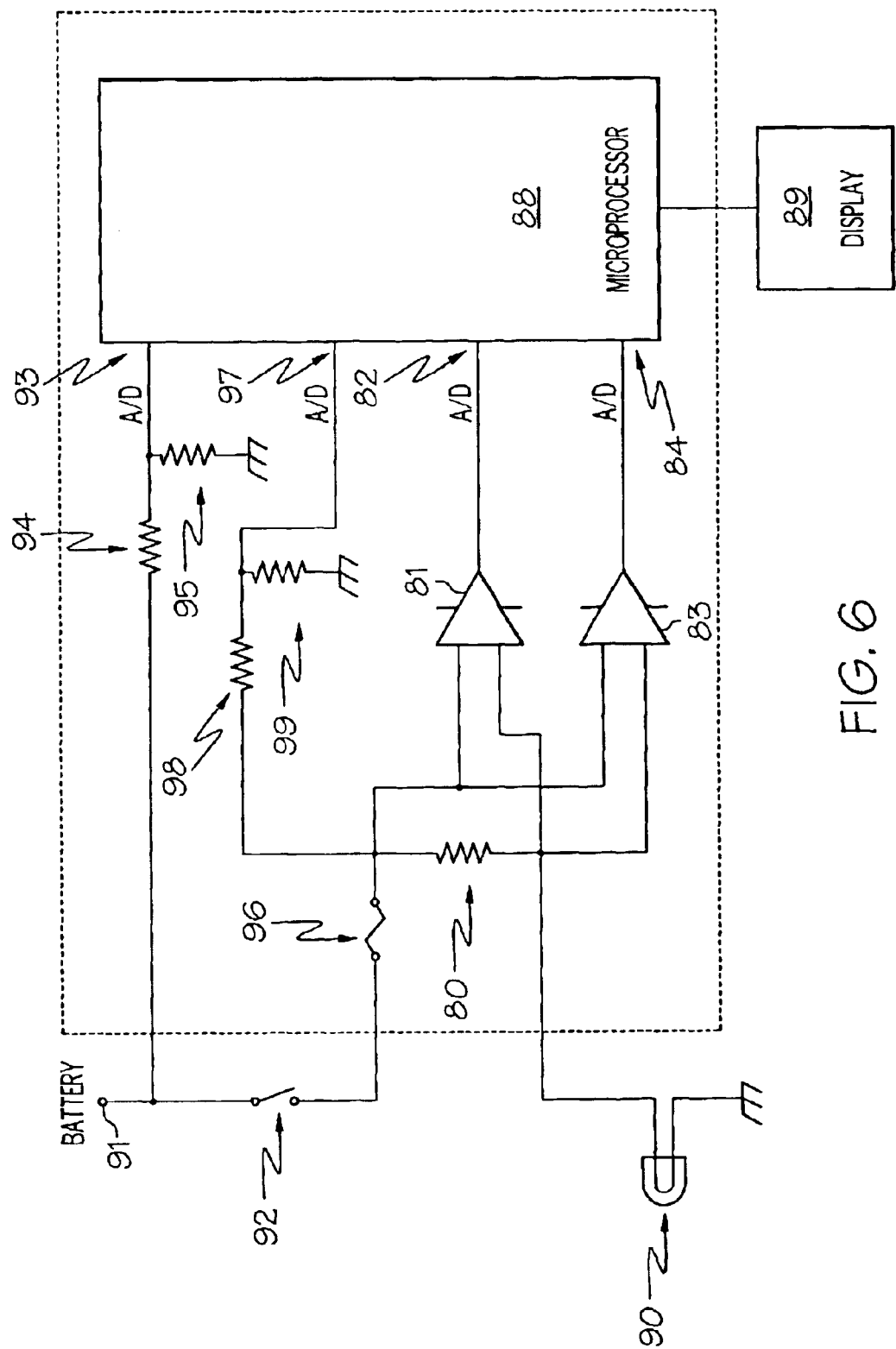
FIG. 6 illustrates an example of a circuit design for a light monitor.

FIG. 6 illustrates an example of an electrical circuit for monitoring the light 90. As one with ordinary skill in the art will readily recognize, the present example is only one embodiment of a suitable circuit design and numerous different circuits or variations could be used. The light 90 is connected to a light circuit comprising a battery 91, a switch 92, a fuse 96, and a sense resistor 80. In the present example, the light 90 and sense resistor 80 are connected in series to one another. Connected to the light circuit is a light signal status circuit comprising resistors 98, 99 and input 97 to the microprocessor 88. When the switch 92 is opened the input 97 signals the microprocessor 88 that the light 90 has been attempted to be activated.

A voltage measurement circuit comprises resistors 94, 95 and input 93 to the microprocessor 88. The input 97 represents the measured battery 91 voltage delivered to the light circuit. Preferably, the battery 91 voltage is sampled multiple times consecutively and averaged to obtain an average battery voltage measurement The battery 91 voltage is calculated by the microprocessor 88 based on equation 1:

$$V_{Battery}=(AD_{avg}/AD_{max})*(4.096v)*((R_1+R_2)/R_1) \quad (1)$$

Where:

$V_{Battery}$ is the sample battery voltage $AD_{avg}$ is the digital value for the average voltage measurement $AD_{max}$ is the digital value for the maximum voltage measurement (e.g. 255 for an 8 bit A/D, 1023 for 10 bit A/D, etc.)

4.096v is the microprocessor 88 input reference voltage $R_1$ is the resistance of resistor 95

$R_2$ is the resistance of resistor 94

A low current measurement circuit comprises op-amp 81 and input 82 to the microprocessor 88. A high current measurement circuit comprises op-amp 83 and input 84 to the microprocessor 88. The inputs 82, 84 represent the measured voltage drop across the sense resistor 80 from which the current powering the light 90 can be calculated. Current is calculated from the low current measurement circuit for currents less than a threshold value, and the high current measurement circuit is used to measure currents greater than the threshold value. Preferably, the voltage drop is sampled multiple times consecutively and averaged to obtain an average voltage measurement. In the present example, the high and low current measurement circuits are calibrated based on a two point linear calibration curve. Based on these calibration measurements, the raw inputs 82, 84 are converted by the microprocessor 88 to a calibrated digital value based on equations 2–5:

$$AD_{Theory}=I_{Light}*R_{sense}*[(8)*\text{Gain}]*AD_{max}/4.096v \quad (2)$$

$$AD_{calibrated}=AD_{avg}*\text{Slope}+\text{Offset} \quad (3)$$

$$\text{Slope}=[AD_{theory\ 2}-AD_{theory\ 1}]/[AD_{Actual\ 2}-AD_{Actual\ 1}] \quad (4)$$

$$\text{Offset}=AD_{Theory\ 2}-\text{Slope}*AD_{Actual\ 2} \quad (5)$$

Where:

$AD_{Theory}$ is the theoretical digital value for the voltage drop used to reference an analog-to-digital value $I_{light}$ is the sample current through the sense resistor 80

$R_{sense}$ is the resistance of the sense resistor 80

8 is the gain of an optional circuit 61, if no such circuit use a gain of 1

Gain is the gain of the respective op-amp 81, 83

4.096v is the microprocessor 88 input reference voltage $AD_{max}$ is the digital value for the maximum voltage drop used to reference an analog-to-digital value $AD_{Calibrated}$ is the calibrated digital value for the voltage drop used to reference an analog-to-digital value $AD_{avg}$ is the digital value for the average voltage drop measurement Slope is a linear calibration slope Offset is a calibration offset $AD_{Theory\ 1}$ is the $AD_{Theory}$ for first point $AD_{Theory\ 2}$ is the $AD_{Theory}$ for second point $AD_{Actual\ 1}$ is the actual digital value for the voltage drop for first point used to reference an analog-to-digital value $AD_{Actual\ 2}$ is the actual digital value for the voltage drop for second point used to reference an analog-to-digital value Once the calibration is performed, the digital value representing the voltage drop is converted by the microprocessor 88 to an actual current value based on equation 6:

$$I_{Light} = (AD_{Calibrated}/AD_{max}) * (4.096v)/[R_{sense}*(8)*Gain] \quad (6)$$

Where the variables for equation 6 are the same for equations 2–5.

After the light circuit current and battery 91 voltage have been sampled, the light 90 can be analyzed to check if it is operating properly. The light circuit current is converted to a normalized current based on a reference voltage. This allows current samples at various battery 91 voltages to be normalized for a more accurate current comparison. The microprocessor 88 converts a light circuit current at the present battery voltage to a normalized current value using equation 7:

$$I_{Normalized} = I_{Light} - \{Slope * [V_{Battery} - V_{Normalized}]\} \quad (7)$$

Where:

$I_{Normalized}$ is the normalized current $I_{Light}$ is from equation 6

Slope is a linear normalization slope $V_{Battery}$ is from equation 1

$V_{Normalizd}$ is the normalized voltage from the calibration sample

Next, the threshold current is calculated based on a normalized calibrated current. In the present example, the calibrated values are field measured from the light circuit. When a light circuit field calibration is pending, the sampled battery voltage and sampled current are calculated using equations 1 and 7, respectively, and the normalized values stored for future reference. These recorded values are then used to calculate the circuit threshold setting for a light failure. The threshold current is calculated by the microprocessor 88 using equations 8–10:

$$Slope = [I_{Cailibration} - I_{Normalized}]/V_{Calibration} - V_{Normalized}] \quad (8)$$

$$I_{Normalized} = I_{Calibration} - \{Slope * [V_{Calibration} - V_{Normalized}]\} \quad (9)$$

$$I_{Threshold} = I_{Normalized} * Threshold \quad (10)$$

Where:

Slope is from equation 7

$I_{Calibration}$ is the field calibrated current calculated using equation 6

$I_{Normalized}$ is the normalized calibrated current $V_{Calibration}$ is the field calibrated current calculated using equation 1

$V_{Normalized}$ is from equation 7

Threshold is a specified threshold percentage (e.g. 0.3, 0.6, 0.75, 0.95, etc.)

$I_{Threshold}$ is the light fault threshold current

The microprocessor 88 makes a determination if the light circuit current is operating in an acceptable range. If the normalized light current is greater than or equal to current threshold then the light is functioning properly. If below the threshold, a light fault has been detected. The microprocessor 88 send appropriate signals to the display 89 comprising one or visual indicators to indicate the operating status of the light 90.

Having shown and described various embodiments of the present invention, further adaptations of the light monitor system and method described herein can be accomplished by appropriate modifications by one of ordinary skill in the art without departing from the scope of the present invention. Several of such potential modifications have been mentioned, and others will be apparent to those skilled in the art. Accordingly, the scope of the present invention should be considered in terms of the following claims and is understood not to be limited to the details of structure and operation shown and described in the specification and drawings.

What is claimed is:

1. A monitor for a light circuit comprising a power source, a light being monitored, and a sense resistor, the monitor comprising:

a) a first voltage amplifier circuit connected to the light circuit having a first output signal representing the voltage across the sense resistor;

b) a second voltage amplifier circuit connected to the circuit having a second output signal representing the voltage across the sense resistor;

c) a microprocessor configured to receive the output signals from the first and second voltage measuring circuits, said microprocessor being programmed to:

(i) calculate the current to the light based on the first and second digital output signals;

(ii) compare the calculated current against a threshold current;

(iii) initiate a failure signal if the calculated current is less than the threshold current; and d) an indicator that activates if the microprocessor initiates a failure signal, whereby the activated indicator notifies that the light circuit is not operating correctly.

2. The light monitor of claim 1, wherein the light is an exterior light on a vehicle comprising one or more incandescent lights.

3. The light monitor of claim 1, wherein the light is an exterior light on a vehicle comprising one or more LEDs.

4. The light monitor of claim 3, wherein the first and second digital output signals each have a maximum value.

5. The light monitor of claim 1, wherein the calculated current is based on the first output signal if the light is a low current light, and the calculated current is based on the second output signal if the light is a high current light.

6. The light monitor of claim 5, wherein low current is greater than about 0 amps and less than about 1 amp.

7. The light monitor of claim 5, wherein high current is greater than about 1 amp and less than about 10 amps.

8. The light monitor of claim 5, wherein the calculated current is based on the second output signal if the second output signal is greater than a threshold value, and the current is calculated is based on the first output signal if the second output signal is less than the threshold value.

9. The light monitor of claim 1, wherein the first and second voltage amplifier circuits each comprise an operational amplifier.

10. The light monitor of claim 9, wherein the gain ratio between the first and second operational amplifier is about 1:10.

11. The light monitor of claim 1, wherein the calculated current is a function of the measured voltage of the power source.

12. The light monitor of claim 1, wherein the threshold current is a percentage of a calibrated current, said calibrated current being based on a measured voltage across the sense resistor when the light is operating correctly.

13. The light monitor of claim 2, wherein the indicator is an LED visible to the vehicle operator.

14. The light monitor of claim 1, wherein the sense resistor is connected in series with the light.

15. A system for monitoring the operability of exterior lights on a vehicle, the system comprising:
   a) a plurality of light circuits each comprising a light positioned on the exterior of the vehicle;
   b) a plurality of sense resistors each connected to a light circuit in series with the corresponding exterior light;
   c) a plurality of first operational amplifiers each connected in parallel with a sense resistor, each first operational amplifier amplifying the voltage across the corresponding sense resistor to generate a first amplified signal;
   d) one or more multiplexers connected to the operational amplifiers to select a first amplified signal;
   e) at least one second operational amplifier connected to the one or more multiplexers, said at least one second operational amplifier amplifying the selected first amplified signal to generate a second amplified signal;
   f) an analog to digital converter converting the second amplified signal into a digital value;
   g) an indicator to notify the vehicle operator if an exterior light is inoperable; and
   h) a microprocessor being programmed to:
      (i) control the one or more multiplexers to select a first amplified signal corresponding to an exterior light;
      (ii) calculate the current through the sense resistor based on the digital value corresponding to the selected first amplified signal;
      (iii) compare the calculated current against a threshold current;
      (iv) if the calculated current is less than the threshold current active the indicator corresponding to the exterior light.

16. The system of claim 15, further comprising a low impedance buffer for buffering the first amplified signal.

17. The system of claim 15, wherein the at least one second operational amplifier comprises a low current operational amplifier and a high current operational amplifier.

18. The system of claim 17, wherein the calculated current is based on the second amplified signal from the low amperage operational amplifier if the light is a low current light, and the calculated current is based on the second amplified signal from the high current operational amplifier if the light is a high current light.

19. The light monitor of claim 18, wherein a low current light is less greater than about 0 amps and less than about 1 amp.

20. The light monitor of claim 18, wherein a high current light is greater than about 1 amp and less than about 10 amps.

21. The light monitor of claim 18, wherein the calculated current is based on the digital value corresponding to the high current operational amplifier if such digital value is greater than a threshold value, and if such digital value is less than the threshold value then the current is calculated is based on the digital value corresponding to the low current operational amplifier.

22. The system of claim 15, further comprising a battery powering the light circuits and a voltage measurement circuit, wherein the calculated current is normalized based on the voltage measured by the voltage measurement circuit.

23. A vehicle light monitor, comprising:
   a) a plurality of exterior lights on the vehicle, each of said lights having a corresponding light circuit and power source;
   b) means for determining a calibrated current for each of said lights;
   c) means for measuring a voltage in each light circuit, said measured voltage being proportional to the current to the corresponding light;
   d) means for calculating the current to a selected light based on the corresponding measured voltage;
   e) means for normalizing the calculated current based on the voltage of the power source;
   f) means for determining if a light is inoperable based on the corresponding normalized calculated current and the corresponding calibrated current; and
   g) means for signaling the vehicle operator if light is determined to be inoperable.

* * * * *